US007574788B1

(12) United States Patent
Chamlee et al.

(10) Patent No.: US 7,574,788 B1
(45) Date of Patent: Aug. 18, 2009

(54) FOUNDATION COVER STRETCHING AND STAPLING SYSTEM

(75) Inventors: John S. Chamlee, Lawenceville, GA (US); Preston B. Dasher, Lawrenceville, GA (US)

(73) Assignee: Atlanta Attachment Company, Lawrenceville, GA (US)

( * ) Notice: Subject to any disclaimer, the term of this patent is extended or adjusted under 35 U.S.C. 154(b) by 581 days.

(21) Appl. No.: 11/225,766

(22) Filed: Sep. 13, 2005

Related U.S. Application Data

(60) Provisional application No. 60/615,259, filed on Oct. 1, 2004.

(51) Int. Cl.
*B68G 7/00* (2006.01)
*B23P 21/00* (2006.01)

(52) U.S. Cl. .......................... 29/91.1; 29/91.5; 29/448; 29/709; 29/716; 29/798; 227/12; 227/152

(58) Field of Classification Search ..................... 29/91, 29/91.1, 91.2, 91.3, 91.5, 448, 709, 712, 29/714, 716, 798, 464, 559; 269/289 R, 269/909; 227/4, 6, 12, 13, 147, 152, 153, 227/154; 5/737, 696; 112/2.1, 2.2
See application file for complete search history.

(56) References Cited

U.S. PATENT DOCUMENTS

| | | | |
|---|---|---|---|
| 1,947,058 | A | 2/1934 | Pittoni |
| 3,013,513 | A | 12/1961 | Judelson |
| 3,084,345 | A | 4/1963 | Hodges, Jr. |
| 3,490,061 | A | 1/1970 | Docker |
| 3,527,397 | A | 9/1970 | Wortsmith |
| 3,651,954 | A | 2/1972 | Kalning et al. |
| 3,673,906 | A | 7/1972 | Cash |
| 3,753,404 | A | 8/1973 | Bryan, Jr. |
| 3,770,180 | A | 11/1973 | Stumpf |
| 3,789,495 | A | 2/1974 | Stumpf |
| 3,842,451 | A | 10/1974 | McCormick |
| 3,938,204 | A | 2/1976 | Slominski |
| 3,956,783 | A | 5/1976 | Stroller |
| 4,019,447 | A | 4/1977 | Blessing et al. |
| 4,019,451 | A | 4/1977 | Autrey |
| 4,043,282 | A | 8/1977 | Fanghanel |
| 4,067,269 | A | 1/1978 | Fanghanel |
| 4,075,721 | A | 2/1978 | Autrey |
| 4,117,790 | A | 10/1978 | Hasegawa et al. |
| 4,141,304 | A | 2/1979 | Masuda |
| 4,181,085 | A | 1/1980 | Conner, Jr. |

(Continued)

FOREIGN PATENT DOCUMENTS

| | | |
|---|---|---|
| CA | 2126302 C | 11/1996 |

(Continued)

*Primary Examiner*—Jermie E Cozart
(74) *Attorney, Agent, or Firm*—Womble Carlyle Sandridge & Rice PLLC

(57) ABSTRACT

A system for automatically stretching and stapling a foundation cover to a spring unit for a foundation, including a support table for supporting the foundation and cover, and a series of stretching/stapling assemblies or units positioned along the support table. The stretching/stapling assemblies include a series of tension applicators that engage and pull the cover taut against the sides of the spring unit of the foundation, while staplers are lowered into engagement with the cover and foundation frame, automatically stapling the cover to the sides of the foundation frame.

13 Claims, 9 Drawing Sheets

U.S. PATENT DOCUMENTS

| | | | |
|---|---|---|---|
| 6,648,585 | B2 | 9/1981 | Brusasca |
| 4,462,129 | A | 7/1984 | Brannock |
| 4,478,361 | A | 10/1984 | McElhannon |
| 4,498,404 | A | 2/1985 | Sadeh |
| 4,691,651 | A | 9/1987 | Junemann |
| 4,693,460 | A | 9/1987 | Adamson et al. |
| 4,703,706 | A | 11/1987 | Plante |
| 4,742,789 | A | 5/1988 | Pestel et al. |
| 4,776,579 | A | 10/1988 | Romand et al. |
| 4,794,873 | A | 1/1989 | Dordi et al. |
| 4,809,899 | A | 3/1989 | Resta et al. |
| 4,813,364 | A | 3/1989 | Boser |
| 4,825,787 | A | 5/1989 | Babson et al. |
| 4,827,856 | A | 5/1989 | Rohr |
| 4,838,186 | A | 6/1989 | Resta et al. |
| 4,905,615 | A | 3/1990 | Pofferi |
| 4,958,579 | A | 9/1990 | De Weers |
| 5,018,462 | A | 5/1991 | Brocklehurst |
| 5,054,678 | A | 10/1991 | Nasiatka |
| 5,058,794 | A | 10/1991 | Stanton |
| 5,129,569 | A | 7/1992 | Stanton |
| 5,145,144 | A | 9/1992 | Resta et al. |
| 5,185,897 | A | 2/1993 | Van Laanen |
| 4,998,965 | A | 2/1994 | Freermann et al. |
| 5,289,788 | A | 3/1994 | Fukumoto |
| 5,332,202 | A | 7/1994 | Wagner et al. |
| 5,346,113 | A * | 9/1994 | Cosden ........................ 227/110 |
| 5,367,968 | A | 11/1994 | Diaz |
| 5,370,072 | A | 12/1994 | Adamski, Jr. |
| 5,437,238 | A | 8/1995 | Price et al. |
| 5,483,909 | A | 1/1996 | Nogueras |
| 5,497,541 | A | 3/1996 | Nogueira |
| 5,507,047 | A | 4/1996 | Calvert, Jr. et al. |
| 5,515,796 | A | 5/1996 | Ogle |
| 5,529,004 | A | 6/1996 | Porter et al. |
| 5,537,699 | A | 7/1996 | Bonaddio et al. |
| 5,560,308 | A | 10/1996 | Eto |
| 5,586,511 | A | 12/1996 | Porter et al. |
| 4,031,026 | A | 3/1997 | Hall |
| 5,647,293 | A | 7/1997 | Price et al. |
| 5,655,241 | A | 8/1997 | Higgins et al. |
| 5,772,096 | A | 6/1998 | Osuka et al. |
| 5,809,919 | A | 9/1998 | Mitchell et al. |
| 5,864,906 | A | 2/1999 | Pacelli |
| 5,881,656 | A | 3/1999 | Grant |
| 5,904,789 | A | 5/1999 | Durkos |
| 5,915,319 | A | 6/1999 | Price et al. |
| 5,943,971 | A | 8/1999 | Trickett et al. |
| 6,000,352 | A | 12/1999 | Porter et al. |
| 6,202,579 | B1 | 3/2001 | Olewicz et al. |
| 6,209,468 | B1 | 4/2001 | Marcangelo et al. |
| 6,220,494 | B1 | 4/2001 | Raffoni |
| 6,306,234 | B1 | 10/2001 | Barker et al. |
| 6,397,768 | B1 | 6/2002 | Dasher et al. |
| 6,574,815 | B2 | 6/2003 | Freeman et al. |
| 6,581,260 | B2 * | 6/2003 | Kinney ........................ 29/91.1 |
| 6,935,546 | B2 | 8/2005 | Durkos |
| 2002/0046452 | A1 * | 4/2002 | Kinney ........................ 29/91.1 |
| 2002/0050117 | A1 | 5/2002 | Dasher et al. |
| 2005/0081298 | A1 | 4/2005 | Wright et al. |

FOREIGN PATENT DOCUMENTS

| | | | |
|---|---|---|---|
| CA | 189168 | C | 7/1998 |
| DE | 3139426 | A1 | 4/1983 |
| DE | 37 12493 | A1 | 5/1987 |
| EP | 0 220 368 | B1 | 5/1987 |
| EP | 0261558 | A3 | 3/1988 |
| EP | 0 264 618 | A1 | 4/1988 |
| EP | 0 330 285 | A1 | 8/1989 |
| EP | 0 682 135 | B1 | 5/1995 |
| EP | 873 709 | A2 | 10/1998 |
| EP | 0523233 | B1 | 11/1998 |
| FR | 1567893 | | 4/1969 |
| GB | 1384073 | | 2/1975 |
| GR | 2100111 | A | 10/2003 |
| JP | 308465 | | 11/1995 |
| WO | WO 92/12282 | | 7/1992 |
| WO | WO 95/25194 | | 9/1995 |
| WO | WO 9637132 | A1 | 11/1996 |

* cited by examiner

FOUNDATION COVER STRETCHING AND STAPLING SYSTEM

CROSS REFERENCE TO RELATED APPLICATIONS

The present patent application is a formalization of a previously filed, co-pending U.S. Provisional Application Ser. No. 60/615,259, filed Oct. 1, 2004, by the inventors named in this patent application. This patent application claims the benefit of the filing date of the cited provisional patent application according to the statutes and rules governing provisional patent applications, particularly 35 USC § 119(e)(1) and 37 CFR §§ 1.78(a)(4) and (a)(5). The specification and drawings of the provisional patent application is specifically incorporated herein by reference.

FIELD OF THE INVENTION

The present invention generally relates to stapling systems, and in particular, to systems for automatically stretching and stapling or otherwise fastening a cover to a spring unit for a foundation.

BACKGROUND OF THE INVENTION

In the manufacture of bedding such as mattresses, foundations or box springs, stapling operations for forming and attaching borders, panels and other components traditionally have been extremely labor intensive, manual operations that generally have required a significant amount of skill on the part of the operator to cut, staple, and finish the bedding components. The more labor intensive and the greater the amount of skill required of the operator to form a component, however, the greater the cost and the more limited or slower the production of such components. As a result, there have been efforts to develop more automated stapling equipment that will enable less skilled operators to operate the equipment and form bedding components, and/or which can be operated with less operator control or intervention required. This will allow one operator to run multiple stapling stations at the same time in order to increase production, while decreasing the manpower and skill level of the operator required to form the desired bedding components.

In addition, some operations, such as cover stretching and stapling operations, whereby a cover, including a panel with a border attached thereto, is applied to a spring unit or box springs such as for a foundation, requires significant physical exertion on the part of the operator to pull a fabric border or panel to a tightly stretched position or orientation before stapling the fabric to the spring unit. Such action by the operator can lead to significant differences or lapses in quality control, especially over a six to eight hour work shift, during which the operator must repetitively pull and hold the fabric to be sewn or stapled in a stretched position. As the operator tires, or otherwise loosens their grip, the fabric can sag or slip, thus resulting in gaps and/or irregularities that can cause rejection of the foundation, requiring removal and reattachment of the fabric to fix such errors. In addition, such repetitive physical exertion on the part of an operator can, over time, lead to injuries such as carpel tunnel syndrome and other, similar repetitive strain injuries that can result in loss of work and productivity and cause significant disability to such workers.

Accordingly, it can be seen that a need exists for a stretching and stapling system that addresses the foregoing and other related and unrelated problems in the art.

DETAILED DESCRIPTION OF THE INVENTION

Figure 1:
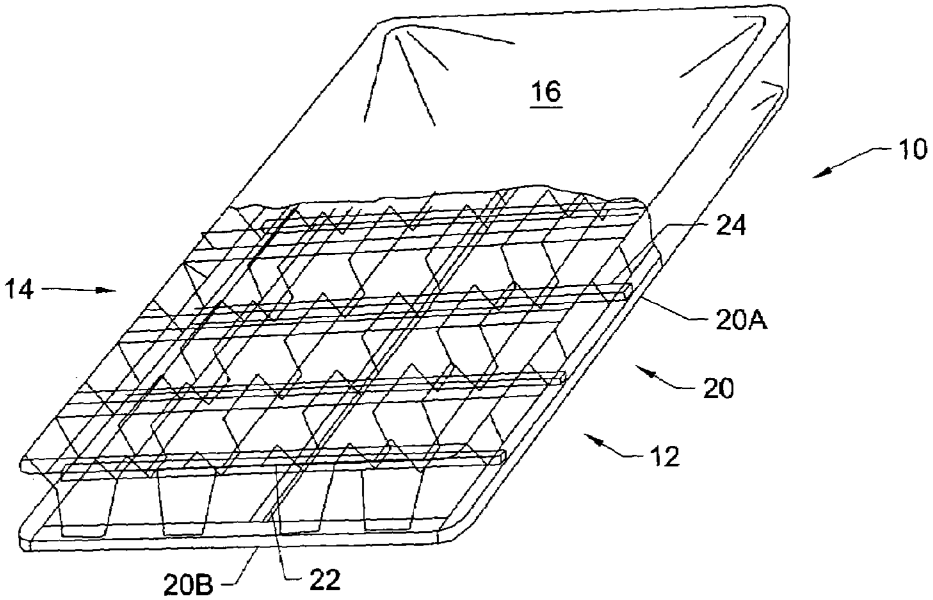
FIG. 1 is a perspective illustration of a spring unit.
Figure 2:
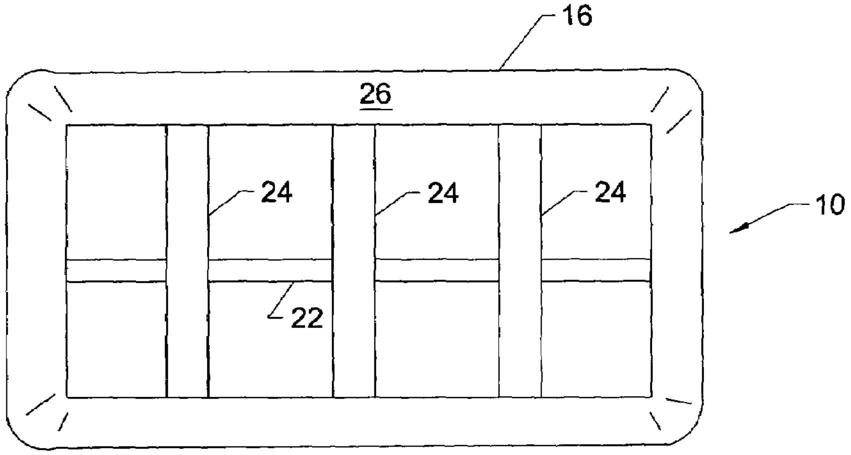
FIG. 2 is a bottom view of the spring unit of FIG. 2.

The present invention is generally directed to an automatic foundation cover stretching and stapling system in which a work piece, such as a cover for a foundation, which generally includes a border attached to a cover panel, is automatically stretched taunt and then attached to a spring unit or box springs for the foundation. FIG. 1 illustrates a box spring or foundation 10 that may be used for supporting a mattress. The foundation 10 generally consists of a base section 12, to which is attached a wire support section 14. The wire support section 14 is made up of a number of interconnected wire elements, which act as springs and a support structure. The foundation 10 is covered with a fabric cover 16, which is partially removed in FIG. 1 to show the wire support section 14. The base section 12 is made up of a generally rectangular frame 20 that has two long sides 20A and two short sides 20B. The perimeter frame 20 may be reinforced with a longitudinal reinforcing member 22 and transverse reinforcing members 24. The various components of the base section 12 may be made from a variety of materials such as wood or plastic, although wood is the commonly used material. In FIG. 2, the bottom portion of the foundation 10 is seen. It can be seen in FIG. 2 that the cover 16 has a lower or bottom portion or flap 26 that covers/overlaps at least a part of the perimeter frame 20. It is this bottom portion 26 that is attached to the perimeter frame 20 and holds the cover 16 in place.

The present invention is designed to provide a stretching and stapling system for the cover 16 to attach the bottom portion 26 thereof to the perimeter frame 20 of the foundation. In the drawing figures that follow and describe the present invention, the foundation 10 has been omitted for the sake of clarity. However, it will be understood that the foundation 10 in all the figures further described will be positioned such that the bottom portion 26 of the cover would be facing upward in the drawings as shown. Thus, the description of these drawings will be with respect to a foundation 10, onto which a cover 16 has been placed, and the bottom portion 26 will be presented for stapling.

Figure 3:
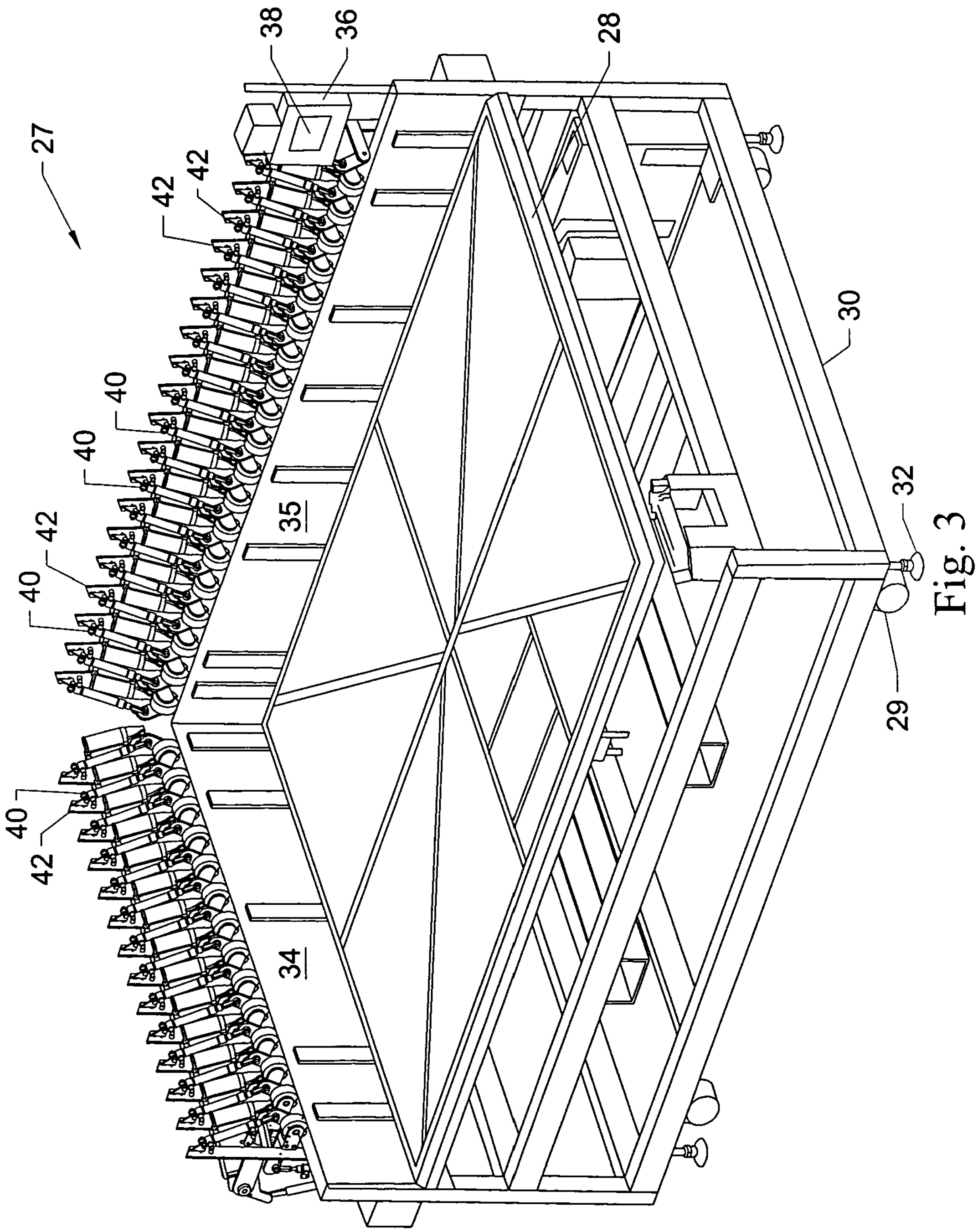
FIG. 3 is a perspective illustration of the cover stretching and stapling system of the present invention.

In FIG. 3, the cover stretching and stapling system 27 of the present invention is shown to include a moveable worktable 28 that is mounted on a frame 30. The frame 30 may be mounted on wheels 29 for movement from one location in a manufacturing facility to another, but in use, will generally have legs 32 extended, so the frame 30 can be fixed in place. The frame 30 also includes a pair of guide walls 34 and 35 that extend along adjacent edges of the moveable table 28 and meet at a substantially right angle. The guide walls 34 and 35 extend vertically above the moveable table and form a corner in which the corner of a foundation or box spring 10 can be received in order to position the foundation 10 in a proper orientation for the stretching and stapling operation. The cover stretching and stapling system also includes a control system including a system controller 36 mounted on the frame 30 and which generally can be programmed with control instructions and/or logic functions for the operation of the stretching and stapling system 10, and preferably has a touch screen 38, keyboard, or other similar input device that allows the operator to enter commands and instructions for operation of the device. A plurality of stretching and stapling assemblies 40 are mounted on vertical supports 42 that are positioned adjacent the guide walls 34 and 35.

Figure 4:
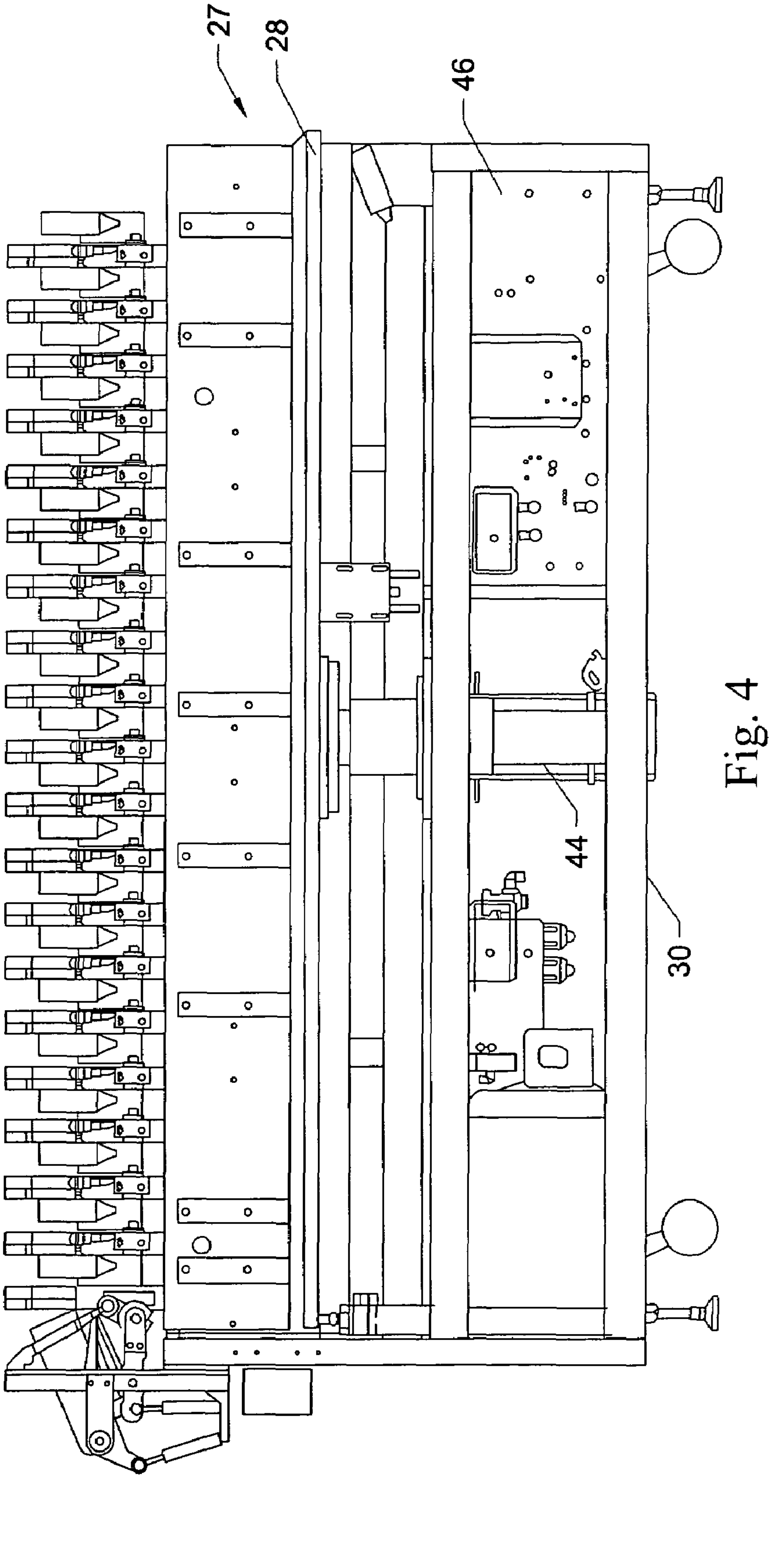
FIG. 4 is a side elevational view of the cover stretching and stapling system of FIG. 3.

In FIG. 4, a lift cylinder 44 is seen as attached to the moveable table 28 for moving the moveable table 28 up and down. Thus, while the lift cylinder 44 may be a hydraulic or pneumatic cylinder, or could be an electric motor. The operation of the cover stretching and stapling system 27 is preferably pneumatically powered, other types of drive systems such as electric servo or stepper motors or other, similar drives also can be used. In order to simplify the drawing figures and to help better understand the operation, the pneumatic lines themselves have been omitted from the drawing figures. However, it will be understood that the pneumatic operating cylinders for both the stretching and stapling assemblies 40 are controlled by/through the system controller 36 for the stretching and stapling system 27. A control system housing 46 is mounted on the frame 30 and contains the electronics and pneumatic control valves that control the functioning/operation of the stretching and stapling system 27. A block diagram of the control system is shown and described in FIG. 8 and is discussed further below.

Figure 5A:
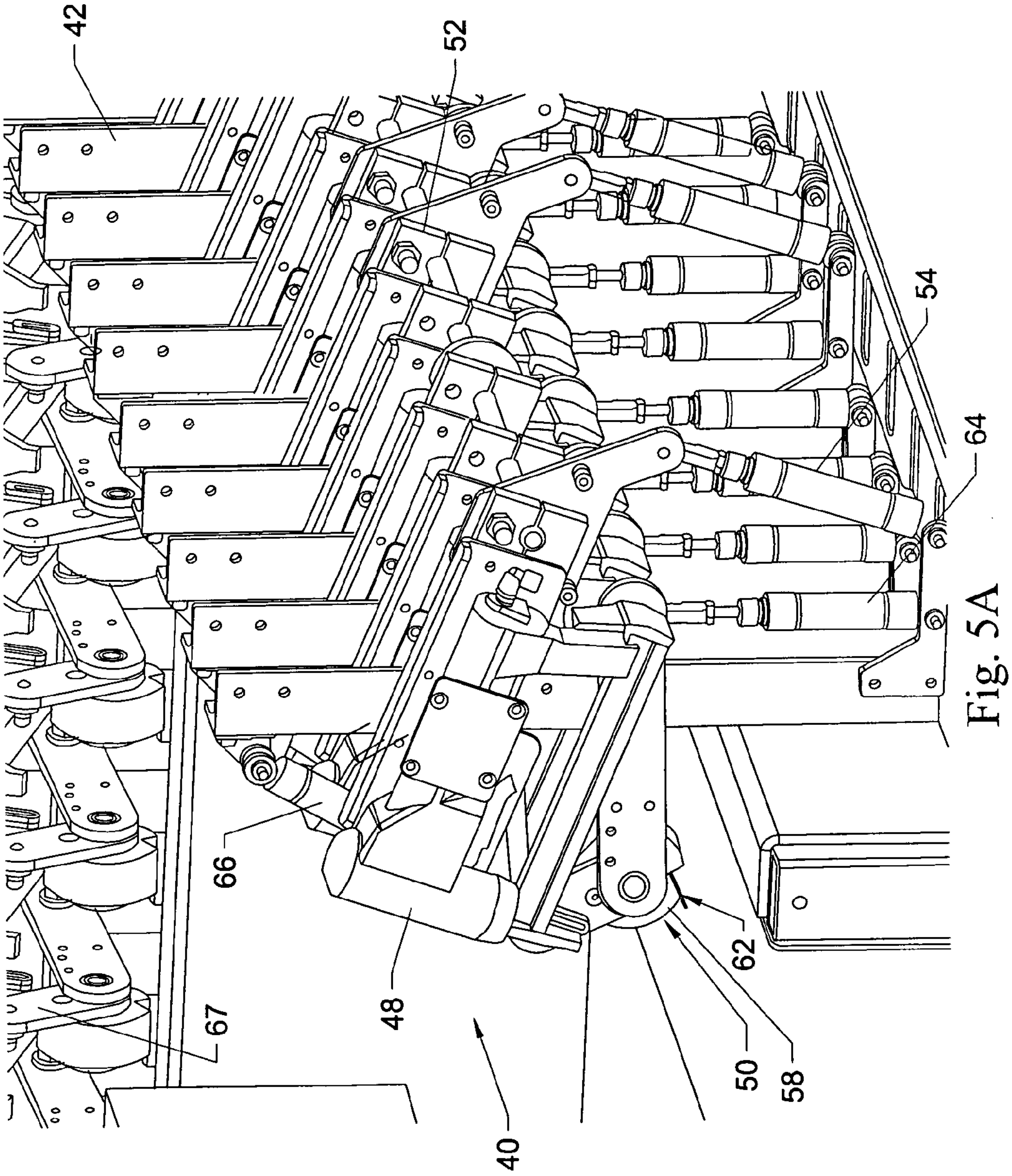
FIGS. 5A and 5B are perspective illustrations showing close-up views of the stretching/stapling assemblies of the cover stretching and stapling system of the FIGS. 3-4.
Figure 5B:
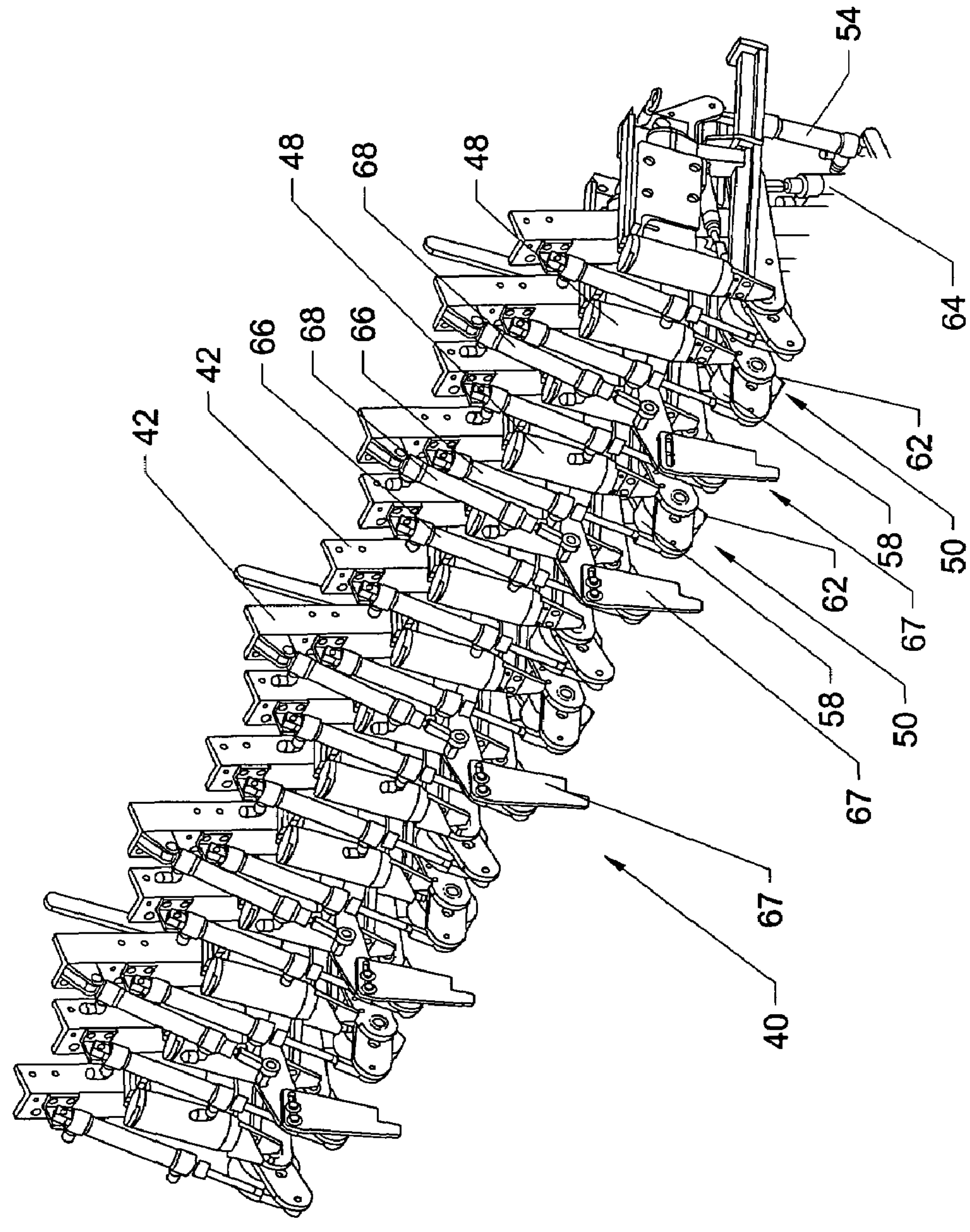
Figure 6A:
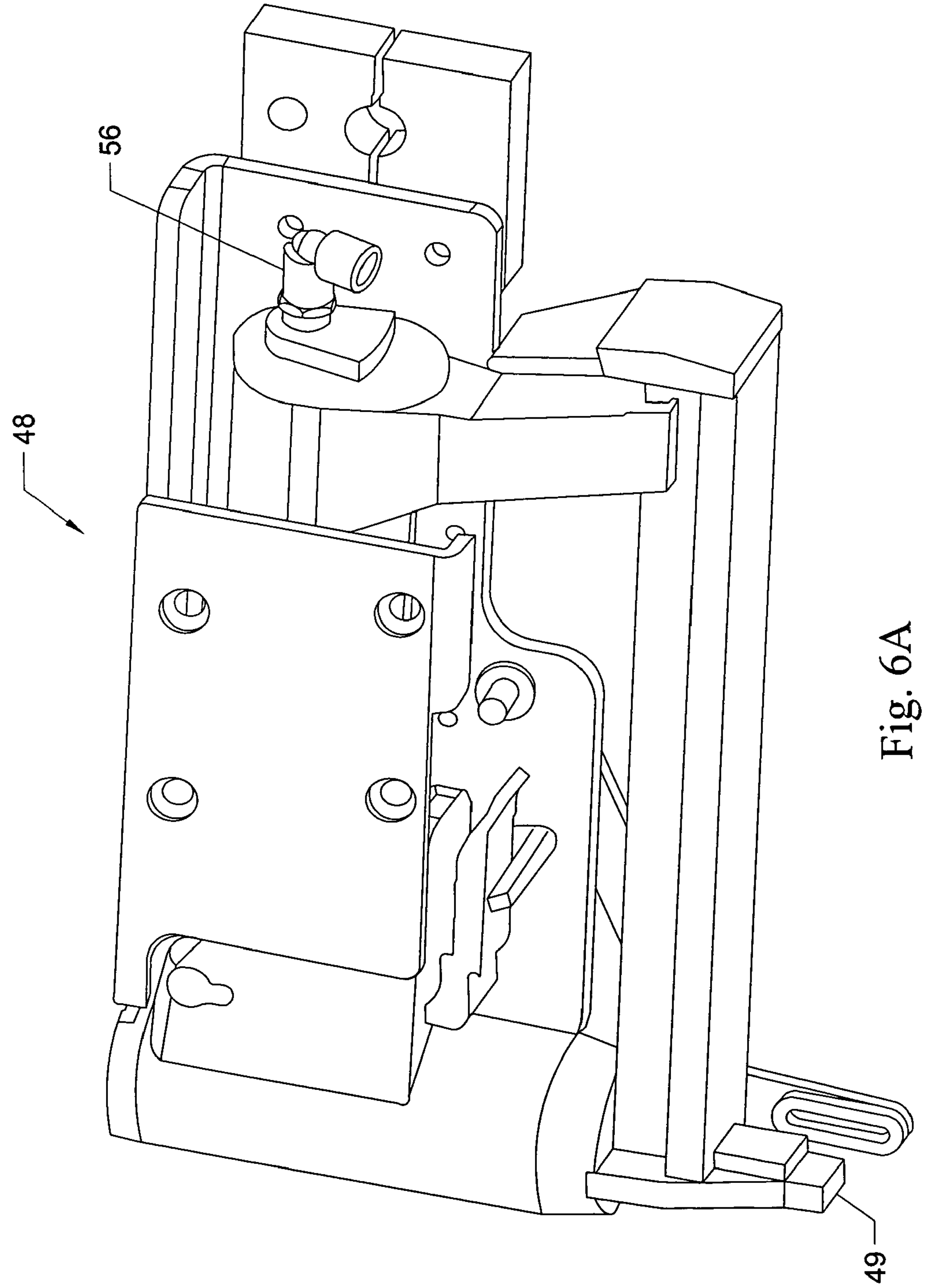
FIGS. 6A and 6B are perspective illustrations of a stapler head of the cover stretching and stapling system of FIGS. 3-4.
Figure 6B:
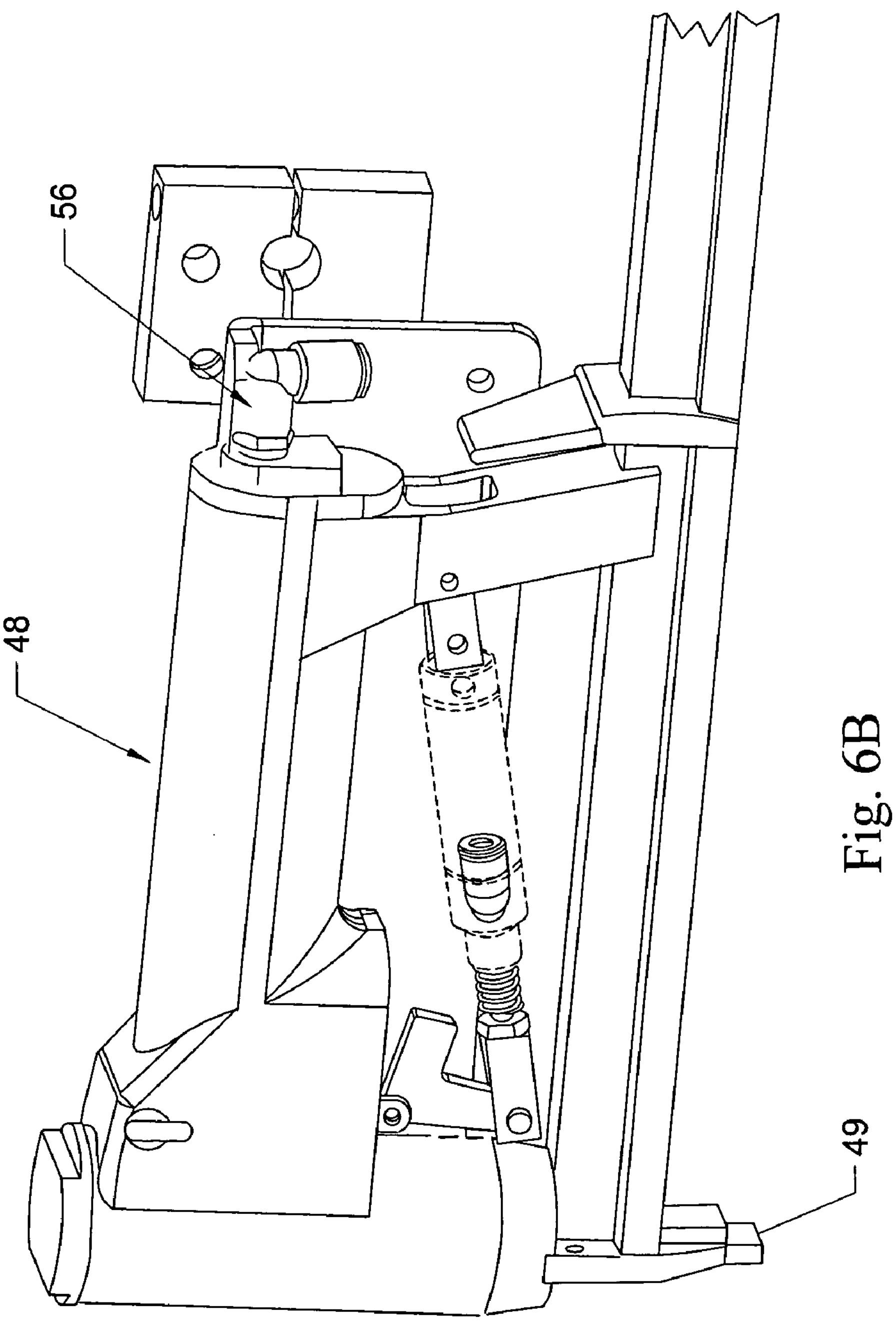

FIGS. 5A and 5B illustrate portions of the stretching and stapling assemblies 40. The stretching and stapling assemblies 40 are made up of a stapler 48 and a tension applicator 50. Both the staplers 48 and the tension applicators 50 are mounted to the vertical support 42. As seen in FIGS. 6A-6B, each stapler 48 generally is of a trigger actuated, pneumatic type, such as those manufactured by the Bostich Corporation, although other, similar stapling or fastening mechanisms also can be used. Some of these staplers 48 can have a trigger mechanism integrated with or positioned adjacent their tip 49 that must be engaged with a spring unit so as to compress and activate the trigger mechanism to cause the staple to fire. As a result, if some of the staplers do not come in contact with the foundation 10, any non-contacting stapler will not fire. As seen in FIGS. 5A-5B, the staplers 48 can be mounted such that their pivot plates 52 are connected together to allow a one or more stapler pivot cylinders 54 to move one or more of staplers 48, typically five, although more could be controlled as desired. Thus, operation of each stapler pivot cylinder 54 will pivot one or more staplers 48 into position to fire. Thereafter, the operation of the stapler to fire staples into the box spring 10 generally is provided or driven by air supplied through an inlet valve 56.

Figure 7:
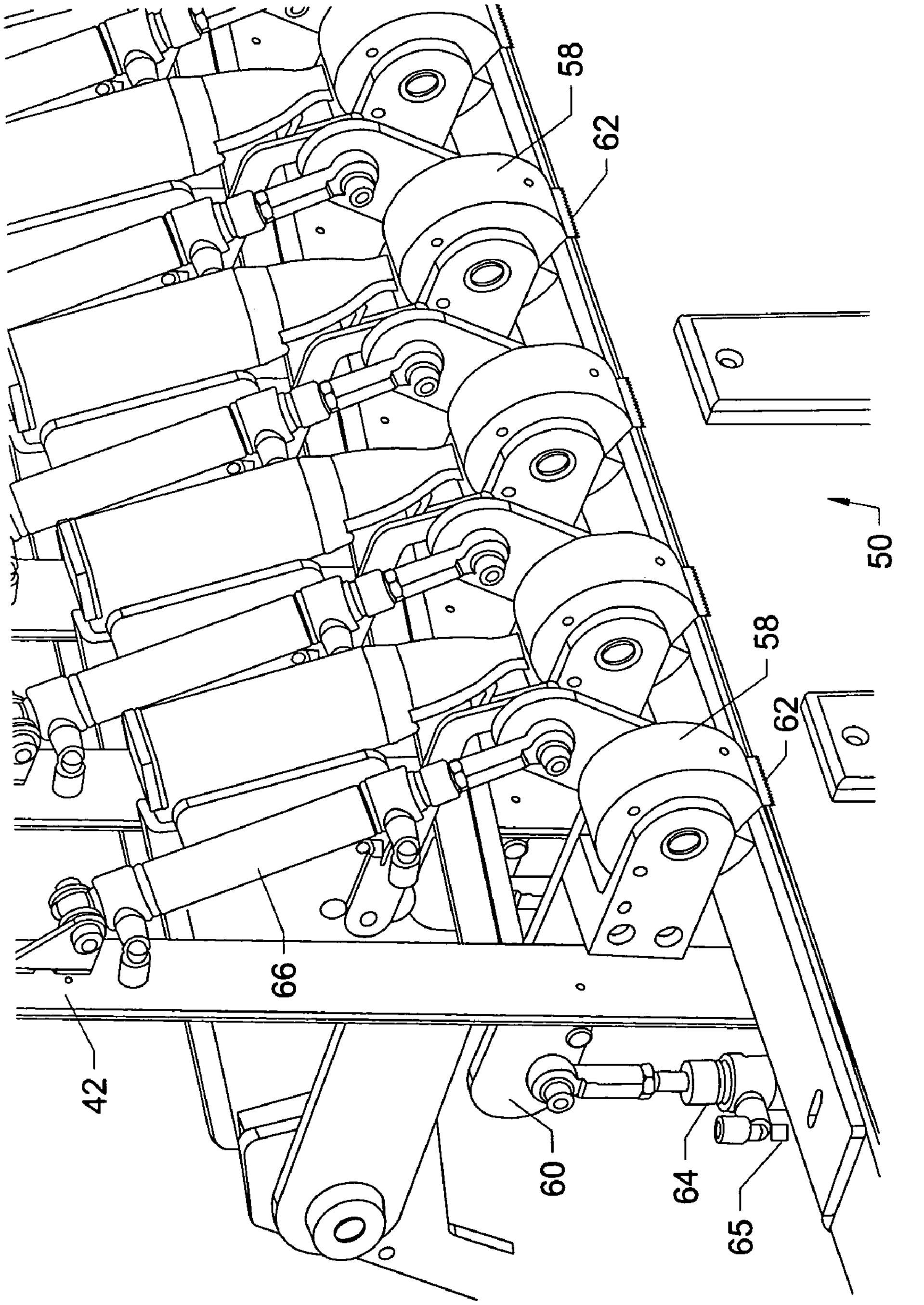
FIG. 7 is a perspective view illustrating the cover tensioning mechanism of the cover stretching and stapling system of FIGS. 3-4.

As shown in FIG. 7, each of the tension applicators 50 generally includes a pivot wheel or member 58 attached to a pivoting support plate 60, and carrying a toothed blade or foot 62. The blade 62 is adapted to engage, pull, or urge the edge of the cover material 16 over the lower portion of the perimeter frame 20 of the foundation 10 as the pivot wheels 58 are rotated. The pivot wheels 58 generally are rotated between a non-engaging or home position and a position in engagement with the cover 16 and foundation 10 by a vertical lift cylinder 64. The vertical lift cylinder 64 is pneumatically operated through the control system of the cover stretching and stapling system 27 and maintains each of the tension wheels 50 in its raised position. A sensor 65, which may be located on at least one of the lift cylinders 64, or mounted separately as needed, generally detects when the foundation 10 has been raised by the worktable 28 to a height sufficient to engage the pivot wheel 58 and blade 62 and will signal the control system to stop any further movement of the moveable worktable 28.

In addition, as shown in FIGS. 5A-5B, tension cylinders 66 are attached to the vertical supports 42 and generally will be activated at the start of a stretching and stapling operation so as to retract their cylinder rods and cause the forward pivoting motion of the pivot wheels 58 and blades 62. As the pivot wheels 58 and blades 62 are pivoted forward, their blade or foot portion 62 will engage and pull the edge of the cover 16 forward over the side of the perimeter frame 20 and hold the cover 16 in place to be stapled. The pivot wheels and blades are generally spaced approximately four to six inches apart along the guide walls 34 and 35, although greater or lesser spacing could be used, so as to apply substantially even tension along the side of a foundation 10 during the stretching and stapling operation and eliminate gaps or sagging between points of engagement. Similarly, as shown in FIG. 5B, hold-down clamps 67 can be mounted adjacent the pivot wheels 58. The hold down clamps 67 generally will be attached to cylinders 68 that pivot the hold down clamps from raised, initial non-engaging positions to lowered, engaging positions to help hold down the cover against the foundation frame for stapling. Both of the sets of cylinders 66 and 68 generally are controlled through a pressure regulator that will allow the amount of tension being applied along the sides of the cover 16 to be controlled to ensure a substantially constant engagement and/or pull on the fabric during substantially each stretching and stapling operation, as well as to minimize and prevent damage to the fabric of the cover 16 during the stretching and stapling operation.

In use of the stretching and stapling system 27 of the present invention, an operator will initially place a cover 16 on the foundation 10 and then place the foundation 10 on the moveable table 28. The operator will then pull the bottom or lower portion 26 of the cover upwardly over the frame 20 to provide a complete covering of the foundation 10. Once the cover 16 has been fitted about the foundation frame, the operator will push the foundation 10 with the cover 16 thereon into the corner of the moveable table 28 against the vertical guide walls 34 and 35. The operator can then initiate a stretching and stapling cycle through engaging the touch panel 38 of the control 36, or alternatively, the control system can detect the placement of the foundation with electronic eyes or switches and can automatically start the stapling cycle. This will cause the pivot wheels and blades of the tension applicators 50 to be lowered toward their engaged position, and the moveable table 28 to be raised vertically toward engagement with the stretching and stapling assemblies 40. If the foundation is not already in a correct position for engagement and stapling, the foundation 10 and cover 16 are raised vertically until they engage the pivot wheels 58 and begin to push the pivot wheels upward against the force of their vertical lift cylinders 64 until a sensor 65 detects the proximity of the frame or is otherwise activated.

The sensor 65 can be a proximity type sensor, contact sensor, or other similar detector or sensor that detects the foundation's position and signals the control system to halt further vertical movement of the moveable table 28. Tension cylinders 66 are then engaged so as to cause the tension wheels 58 to pivot or rotate forward so that the blade or foot portion 62 will engage and pull the edges of the bottom portion 26 of the cover 16 over the side edges of the perimeter frame 20. This will place the cover in a position for stapling with the portions of the bottom portion 26 of the cover being engaged and pulled taunt to eliminate sagging or gapping.

Then, the stapler pivot cylinders 54 will be pivoted downwardly into an engaging position with the bottom portion 26 of the cover.

As the staplers 48 are pivoted into contact with the perimeter frame of the foundation and the bottom portion 26 of the cover, the triggers of the stapler will be engaged and staples will be caused to fire. As a result, the lower portion 26 will be stapled along at least two edges of the foundation 10. After the first two edges of the bottom portion of the cover 16 have been attached to the frame to the foundation 10, the pivot wheels 58, with the blades 62 carried therewith, are released and pivoted rearwardly away from engagement with the bottom portion 26 of the cover. Thereafter, lift cylinders 64 then can be retracted to lift the pivot wheels 58, the end clamps will be released, and the staplers 48 pivoted rearwardly to a non-engaging position. Thereafter, the operator then can remove and/or rotate the foundation 10 to present the remaining two sides of the foundation for a similar stretching and stapling operation to that described above.

Figure 8:
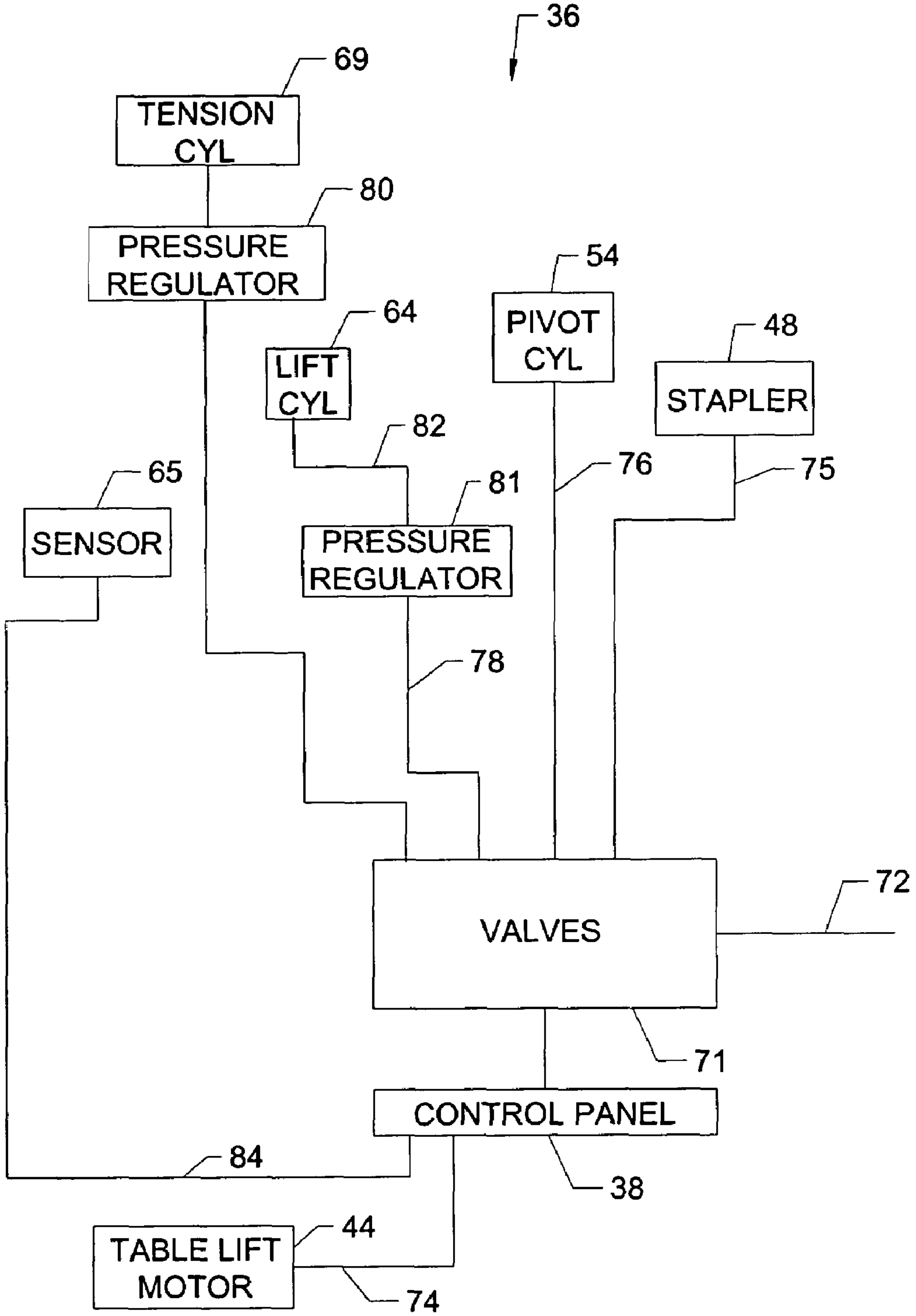
FIG. 8 is a schematic block diagram of the control system of the present invention.

FIG. 8 is a schematic block diagram of the control system of the present invention. The electronic system controller 36 of the stretching and stapling system controls a plurality of electrically controlled pneumatic air valves 71 that feed air to the various parts of the system. A pneumatic/air input line 72 provides compressed air to the valves 71. The diagram of FIG. 8 is a schematic block diagram and as such it will be understood that while a single line is shown as supplying air to the various components of the system, in actual operation, air will be supplied through a plurality of lines or manifolds, such that each of the operating cylinders in the system will receive its own supply of air. Instructions for operation of the cover stretching and stapling system generally will be input or programmed into the controller via the operator control panel 38.

The table lift motor 44 is provided with electrical signals through line 74 connected to the controller 36. An air supply line 75 is connected to one of the valves 71 for supplying compressed air to the staplers 48 for their operation. An air supply line 76 likewise generally is connected to one of the valves 71 to provide air to the stapler pivot cylinders 54, which operate the pivot plates 52 on which the staplers 48 are mounted. A further air supply line 78 connects a valve 71 to an air pressure regulator 81 from which a supply line 82 is connected and provides air to the vertical lift cylinders 64. As previously discussed, the provision of the pressure regulator 80 controlling the air flow to the valves 67 allows for fine tuning of the force provided to the blade portions 62 of the pivot wheels 58. An electrical connection 84 connects the sensor 65 to the system controller 36. The sensor 65, as previously noted, senses when the foundation 10 has been moved into position for operation of the system. These signals are passed back and forth via the line 84 to and from the system controller 36 to operate the components of the cover stretching and stapling system according to programmed instructions, or alternatively, by manual control of an operator.

It will be understood by those skilled in the art that while the invention has been discussed above with reference to preferred embodiments, various changes, modifications and additions can be made thereto without departing from the spirit and scope of the invention as set forth in the following claims.

The invention claimed is:

1. A system for automatically stretching and stapling a work piece to a frame, comprising:

a support table;

a plurality of stapling assemblies mounted along at least one side of said support table, each including a stapler moveable from a non-engaging position into an engaging position against the frame for attaching the work piece to the frame;

a plurality of stretching assemblies mounted adjacent said plurality of stapling assemblies, each including a tension applicator for engaging and applying tension to the work piece to hold the work piece about the frame during attachment thereto;

wherein each of said tension applicators comprises a blade and a cylinder for moving said blade into engagement with the work piece; and a control system for monitoring and controlling a stretching and stapling operation.

2. The system of claim 1 wherein at least one of said tension applicators includes a sensor for signaling movement of the frame into a position for stretching and stapling the work piece thereto.

3. The system of claim 1 and wherein each of said tension applicators further comprises a pivot wheel to which said blade is mounted for moving said blade into engagement with the work piece to hold the workpiece in place while it is stapled by said stapling assemblies.

4. The system of claim 1 further including a lift cylinder for said support table for raising and lowering the frame and work piece toward and away from engagement with said stapling assemblies and said stretching assemblies.

5. The system of claim 1 wherein the frame is a foundation for supporting a mattress and the work piece is a cover for the foundation.

6. A system for automatically stretching and stapling a work piece to a frame, comprising:

a support table;

a plurality of stapling assemblies mounted along at least one side of said support table, each including a stapler moveable from a non-engaging position into an engaging position against the frame for attaching the work piece to the frame;

a plurality of stretching assemblies mounted adjacent said plurality of stapling assemblies, each including a tension applicator for engaging and applying tension to the work piece to hold the work piece about the frame during attachment thereto;

wherein said tension applicators further include control means for adjusting an amount of tension applied to the work piece; and a control system for monitoring and controlling a stretching and stapling operation.

7. The system of claim 6 wherein said tension applicators are pneumatically operated and wherein said control means comprises a pressure regulator.

8. A system for automatically stretching and stapling a work piece to a frame, comprising:

a support table;

a plurality of stapling assemblies mounted along at least one side of said support table, each stapling assembly including a stapler that is moveable from a non-engaging position into an engaging position against the frame for attaching the work piece to the frame;

a plurality of stretching assemblies mounted adjacent said plurality of stapling assemblies, each including a tension applicator for engaging and applying tension to the work piece to hold the work piece about the frame during attachment thereto; and a control system for monitoring and controlling a stretching and stapling operation;

wherein one or more of said staplers includes a trigger mechanism having a sensor for detecting the frame and signaling said control system to cause said staplers to fire a staple into the work piece when said trigger mechanism is contacted.

9. The system of claim 8 wherein each of said stapling assemblies includes a pivot plate supporting said stapler, and a cylinder for moving said pivot plate to bring said stapler into and out of contact with said work piece.

10. A method for automatically stretching and stapling a work piece to a frame comprising:

placing a work piece over a frame;

placing the frame with the work piece thereon on a vertically moveable support table;

moving said support table and the frame and work piece into contact with a plurality of stretching assemblies;

ceasing movement of the support table upon detection of the frame moving into proximity with the stretching assemblies;

stretching the work piece on the frame with the stretching assemblies; and stapling the work piece to the frame with a plurality of stapling assemblies.

11. The method of claim 10 wherein stapling the work piece to the frame comprises:

pivoting a stapling mechanism in response to a signal from a system controller;

contacting the work piece and frame with the stapling mechanism, and in response to such contact, stapling the work piece to the frame.

12. The method claim 10 wherein stretching the work piece on the frame comprises controlling the amount of tension applied to the work piece.

13. The method of claim 10 wherein stretching the work piece comprises:

supplying a flow of air to at least one pneumatic cylinder of each of the stretching assemblies to apply an amount of tension to the work piece; and regulating the flow of air supplied to the at least one pneumatic cylinder with a pressure regulator to control the amount of tension applied.

* * * * *